United States Patent Office 3,141,009
Patented July 14, 1964

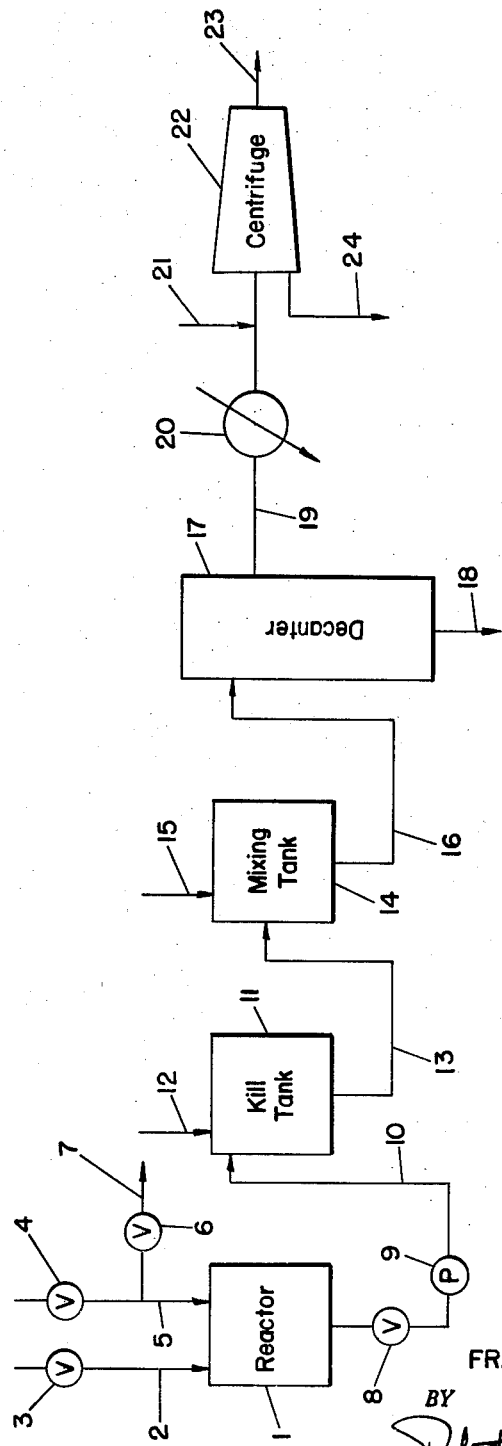

---

3,141,009
PROCESS FOR FRACTIONATING POLYOLEFINS
Frank R. Shuman, Jr., Media, Pa., assignor to Sun Oil Company, Philadelphia, Pa., a corporation of New Jersey
Filed Sept. 24, 1959, Ser. No. 842,010
5 Claims. (Cl. 260—88.2)

This invention relates to the purification of polyolefins, and more particularly to a process for removing catalyst residues and hydrocarbon-soluble polymer from crystalline polyolefins.

It is known that alpha-olefins, such as ethylene, propylene, butene-1, and other alpha-olefins up to about 8 carbon atoms, may be polymerized or co-polymerized at moderate temperatures and pressures in the presence of a compound of a metal of Groups IV–B, V–B and VI–B of the Periodic System, activated by an organo-metallic compound which acts as a strong reducing agent, to form polymers useful for forming films and fibers. Usually the reaction is carried out in the presence of an inert hydrocarbon diluent such as heptane or isooctane, although disclosure of a vapor-phase reaction has been made. Preferred catalysts are the reaction products of titanium halides and aluminum alkyls, and/or aluminum chloralkyls. The polymerization is usually carried out at temperatures of from about 0° C. to about 250° C., and at pressures of from atmospheric to about 500 p.s.i.g.

In such polymerizations two types of polymer are produced, a crystalline or semi-crystalline polymer which is insoluble in the diluent at temperatures below about 150° F., and an amorphous polymer which is soluble in boiling pentane, and which is soluble in the diluent at normal temperatures. Presence of the pentane-soluble polymer in the finished polyolefin is very undesirable, since it reduces the tensile strength and adversely affects other properties of films and fibers made from the polyolefin. In addition, it is readily extractable by olive oil, so that films containing more than a trace of pentane-soluble polymer cannot be used for packaging foodstuffs such as meats and other fatty foods.

At the end of the polymerization reacton, in accordance with usual practice the reaction mixture is removed from the reactor and is treated with a small amount of anhydrous methanol or other polar solvent to deactivate the catalyst, and to convert the catalyst residues to methanol-soluble compounds. The slurry of polymer is then filtered to recover solid polymer as a filter cake, which will, however, contain from 40 to 60 percent liquids, based on the polymer. Since the liquid contains a considerable amount of dissolved pentane-soluble polymer, the cake cannot be sent directly to a dryer, since an excessive amount of the amorphous polymer would remain in the finished polymer. In addition, the cake will contain occluded catalyst residues, which are undesirable in the finished product, since they promote oxidative degradation of the polymer, and impart a dark color thereto.

It has therefore been considered necessary to repulp the filter cake with methanol, and to refilter, repeating this process for a sufficient number of times to reduce the pentane-solubles and catalyst residue in the filter cake to an acceptable amount. After the $C_5$ soluble content of the filter cake has been reduced to an acceptable amount, the cake is washed with methanol to further insure purity. Such an operation requires a very considerable investment in equipment.

It is an object of this invention to provide a process for separating catalyst residues and $C_5$ soluble polymer from crystalline polyolefins which involves a minimum of processing steps.

I have found that this object can be accomplished by treating the contents of the reactor, upon completion of the polymerization, with methanol or another water-miscible polar compound such as ethanol, isopropanol, ethylene glycol, or acetone, in order to destroy the catalyst activity and to convert the catalyst components into soluble compounds. When methanol is used in this step the quantity should not exceed 65 volume percent of the reaction mixture, since at higher concentrations a single liquid phase will be formed, and the methanol will precipitate the pentane-soluble polymer. When other deactivators are used, the quantity should also be held below that which will precipitate soluble polymer. Preferably, from about 5 to about 20 volume percent of methanol should be used. The temperature in this step should be held above 160° F. in order to effect solution of the catalyst residues in the methanol, and the mixture should be stirred for from about three-quarters of an hour to about one and one-half hours in order to allow the reaction between the methanol and the catalyst components to go to completion.

Sufficient water is then added to the mixture to yield an aqueous methanol phase having a specific gravity greater than methanol, in order to facilitate phase separation. Usually about one to two volumes of water per ten volumes of methanol will be satisfactory, but larger volumes may be used if desired. The mixture is then taken to a settler in which the mixture settles into a lower aqueous phase comprising water, methanol, and dissolved catalyst residues, and an upper hydrocarbon phase comprising solid crystalline polymer, diluent, and dissolved amorphous polymer. In some instances the specific gravity of the solid polymer may be greater than that of the aqueous methanol solution. However, the individual particles of solid propylene are made up of a matted mass of filaments, which are preferentially wetted by the diluent, and the occluded diluent will lower the apparent specific gravity of the particles by an amount sufficient to cause the particles to be suspended in the hydrocarbon phase. Temperature during the settling step is advantageously from about 100° F. to about 120° F.

The two phases are then separated by decantation, and the hydrocarbon phase is cooled to about 80° F. to 90° F. From about 10 to 40 weight percent of anhydrous methanol is now added, and the mixture is passed to a centrifuge. Centrifugal force will compact the solid polymer, and force diluent from the interior of the particles, so that their apparent specific gravity will be greater than methanol, and a cake of polymer with occluded methanol can be recovered from the periphery of the centrifuge, while a solution of amorphous polymer in diluent is recovered from the center of the centrifuge, thus effecting a clean separation of crystalline polymer from amorphous polymer in a single step.

In order that those skilled in the art may more fully appreciate the nature of my invention and the means for carrying it out, an example thereof will be more particularly described in connection with the accompanying drawing, which is a flow sheet of the process of the invention.

A 100 gallon jacketed autoclave reactor 1, equipped with a turbine type stirrer, is cleaned and is thoroughly purged with nitrogen. 60 gallons of dry, oxygen-free isooctane containing 0.3 pound of titanium trichloride and 0.44 pound of aluminum triethyl is then pumped into the reactor through line 2, valve 3 is closed, and the mixture is heated to 165° F. with stirring. Valve 4 is then opened and propylene under a pressure of 140 p.s.i.g. is admitted to reactor 1 through line 5. Polymerization of the propylene begins immediately, and additional propylene is continuously admitted through line 5 for a period of three hours at a rate sufficient to maintain the pressure in reactor 1 at 140 p.s.i.g. while holding the reactor temperature at 160–170° F. At the end of this time the reactor contains a slurry comprising 15 weight percent of solid crystalline polypropylene. The reaction may be continued for a longer period of time, or it may be run at a higher pressure, to obtain a more concentrated slurry. It has been found that a 15 weight percent slurry is a convenient concentration to handle in the subsequent processing stage, so that the polymerization is preferably terminated when the reaction has proceeded to this extent. Valve 4 is now closed, and valve 6 is opened to vent unreacted propylene through line 7. After excess propylene has been vented, valve 8 is opened, and the reactor contents are forced by pump 9 through line 10 to fill tank 11.

Five gallons of anhydrous methanol is then added through line 12, and the slurry is agitated for one hour while holding the temperature at 165° F., to insure complete conversion of the catalyst components to methanol-soluble materials. In this step it is necessary that anhydrous methanol be used, since if water is present the titanium and aluminum compounds may be hydrolyzed to the insoluble oxides. Other alcohols, such as ethanol or isopropanol; glycols, such as ethylene glycol; or ketones, such as acetone, may be substituted for methanol as the catalyst deactivator, if used in an amount small enough to avoid precipitation of the pentane-soluble polymer.

The slurry is then transferred through line 13 to mixing tank 14 in which it is mixed with ten gallons of water from line 15, and is then transferred through line 16 to decanter 17 in which it is allowed to settle into a lower aqueous methanol phase containing substantially all of the titanium and aluminum compounds, and an upper hydrocarbon phase consisting of isooctane, dissolved amorphous polypropylene, and solid crystalline polypropylene. The methanol phase is withdrawn through line 18 for further treatment to recover methanol for recycle. The hydrocarbon phase is withdrawn through line 19, passed through cooler 20 in which its temperature is reduced to 80° F., and is mixed with fifteen gallons of anhydrous methanol from line 21. The mixture is then passed to a solid bowl centrifuge 22 from which a low-density stream of isooctane containing dissolved amorphous polypropylene is removed through line 23, while a centrifuge cake consisting of polymer and methanol is removed through line 24. Centrifugal force is necessary to compact the polypropylene to a sufficient extent to make a clean separation from the isooctane, since if an attempt is made to separate the solid polypropylene by adding methanol to the isooctane-polypropylene slurry, followed by gravity separation, it will be found that a separation cannot be had, since the polypropylene is preferentially wetted by the isooctane, and the polymer particles, which are tiny balls of matted filaments, contain so much occluded isooctane that their density is less than the methanol, and the particles will not settle readily. If, however, centrifugal force is applied the isooctane can be squeezed out of the polymer particles so that they can be recovered with the methanol essentially free of isooctane and pentane-soluble polymer. The slurry of polypropylene in methanol is then drained free of excess methanol, and the cake is passed to a drying oven to drive off adherent methanol.

Polypropylene prepared by the foregoing procedure contains less than 1% pentane-soluble polymer, and the aluminum and titanium content is within the range of 0 to 40 parts per million. It will thus be appreciated that the process of the present invention produces a highly pure polymer.

The invention claimed is:

1. A process for fractionating polyolefins which comprises mixing with a slurry of solid crystalline polyolefin in a hydrocarbon diluent having a specific gravity less than methanol and containing dissolved amorphous polyolefin, from 10 to 40 volume percent, based on the volume of the slurry, of methanol, whereby to form a system having a hydrocarbon phase and a methanol phase, subjecting the system to centrifugal force whereby to transfer the solid polyolefin from the hydrocarbon phase to the methanol phase, recovering a first product stream consisting essentially of solid polyolefin slurried in methanol and a second product stream consisting essentially of hydrocarbon diluent containing dissolved amorphous polyolefin, separating methanol from the solid polyolefin, and recovering a polyolefin product containing less than about one percent of polyolefin soluble in boiling pentane.

2. The process according to claim 1 in which the polyolefin is polyethylene.

3. The process according to claim 1 in which the polyolefin is polypropylene.

4. The process according to claim 1 in which the polyolefin is polybutene-1.

5. The process according to claim 1 in which the polyolefin is a copolymer of ethylene and propylene.

References Cited in the file of this patent

UNITED STATES PATENTS

| | | |
|---|---|---|
| 2,837,504 | Hanson et al. | June 3, 1958 |
| 2,845,410 | De Vault et al. | July 29, 1958 |
| 2,874,153 | Bowman et al. | Feb. 17, 1959 |
| 2,886,561 | Reynolds et al. | May 12, 1959 |
| 2,898,327 | McCulloch et al. | Aug. 4, 1959 |
| 2,905,645 | Anderson et al. | Sept. 22, 1959 |
| 2,913,446 | Cull et al. | Nov. 17, 1959 |
| 2,913,447 | Hofheim et al. | Nov. 17, 1959 |
| 2,996,459 | Andersen et al. | Aug. 15, 1961 |
| 3,001,976 | Langer et al. | Sept. 26, 1961 |